April 1, 1941.  I. POMIERANIEC  2,237,197

PLANT GRIPPER CHAIN FOR TRANSPLANTING MACHINES

Filed July 24, 1939  2 Sheets-Sheet 1

Inventor

Israel Pomieraniec

By Clarence A. O'Brien
and Hyman Berman
Attorneys

April 1, 1941. I. POMIERANIEC 2,237,197
PLANT GRIPPER CHAIN FOR TRANSPLANTING MACHINES
Filed July 24, 1939 2 Sheets-Sheet 2
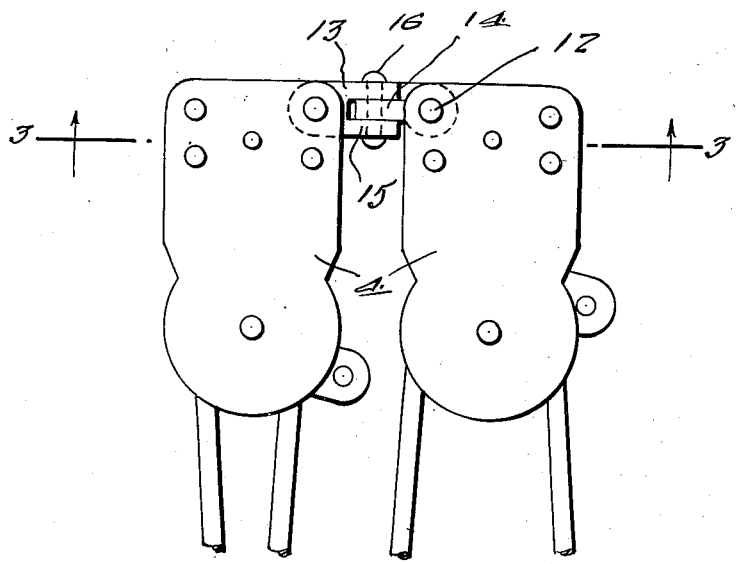
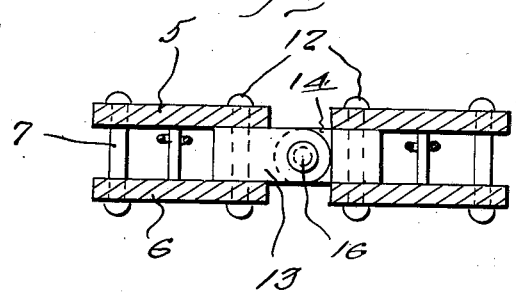
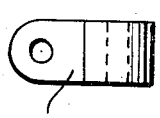
Inventor
*Israel Pomieraniec*
By *Clarence A. O'Brien
and Hyman Berman*
Attorneys Patented Apr. 1, 1941

2,237,197

UNITED STATES PATENT OFFICE 2,237,197

PLANT GRIPPER CHAIN FOR TRANSPLANTING MACHINES

Israel Pomieraniec, London, England, assignor to Transplanters Holding Company Limited, London, England Application July 24, 1939, Serial No. 286,275
In Great Britain October 25, 1938

2 Claims. (Cl. 198—179)

The present invention relates to transplanting machines designed particularly for use in planting tobacco, cabbage, saplings and similar plants and has for its primary object to provide a machine in which the feeders for the plant are adapted to sit in a line at right angles to the movement of the machine for feeding the plant to the plant grippers.

In carrying out the present invention I provide a planting machine having a plurality of gripping devices movable in a circulatory path to and from planting position through one or more plant feeding position, the arrangement being such that the said gripping devices travel through the plant feeding position or positions substantially at right angles to the direction of travel of the machine and travel through the plant setting position substantially in line with the direction of travel of the machine.

An important object of the present invention is to provide an endless chain for the plant gripping devices wherein the chain is articulated in a manner capable of flexing in two directions at right angles so that the chain can run from the plant setting positions vertically upward, then horizontally transversely of the machine, around a pulley and then backwards again transversely of the machine and vertically downward to the plant setting position.

Other objects and advantages reside in the details of construction and operation as more fully hereinafter described and claimed, reference being had to the accompanying drawings forming part hereof, wherein like numerals refer to like parts throughout and in which:

Figure 2 is a top plan view of a pair of the links for the plant grippers.

Figure 3 is a sectional view taken substantially on a line 3—3 of Fig. 2.

Figure 4 is a transverse sectional view through the connecting members for the links and Figure 5 is a detail of one of the connecting members.

Figure 1:
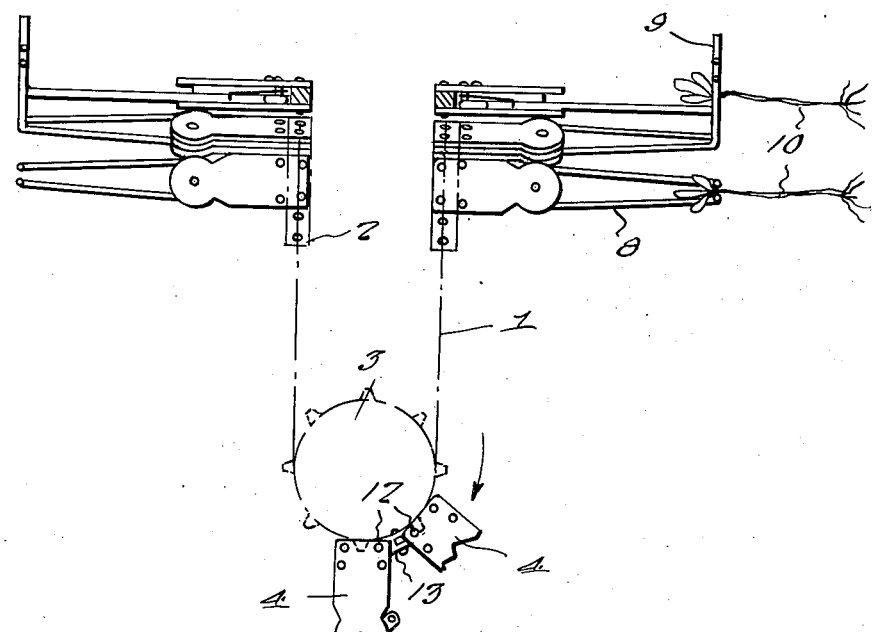
Figure 1 is a diagrammatic side elevational view of the endless conveyor or chain for the plant gripping devices with parts broken away and shown in section.
Figure 4:
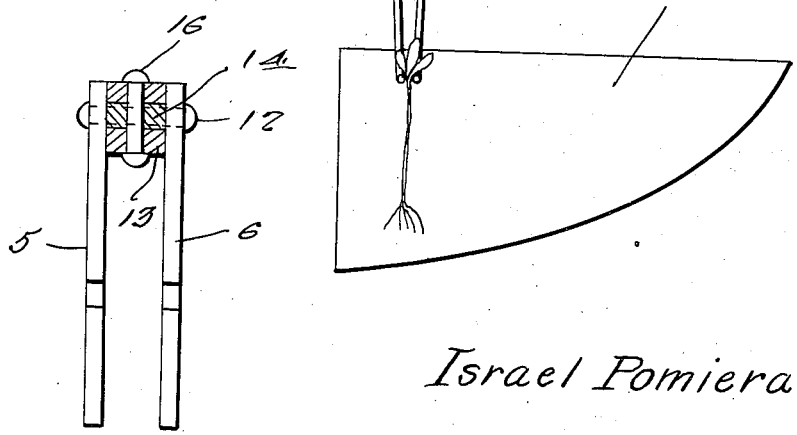

Referring now to the drawings in detail, and with particular reference to Fig. 1 of the drawings, a conveyor construction is illustrated, such as disclosed in detail in my co-pending application Serial No. 286,274 and which includes an endless chain 1 arranged to run or travel over spaced guide sprockets or pulleys 2 having a common horizontal axis and thence downwardly about a drive sprocket or pulley 3 having its axis below the plane of the axis of the pulleys 2 and at right angles thereto, the same traveling in a direction as indicated by the arrows, so that the conveyor or chain runs in two planes, one parallel with the ground and the other perpendicularly thereto. The chain or conveyor is formed of a plurality of links designated generally at 4 and including spaced parallel plates 5 and 6 fixedly connected to each other by rivets or pins 7. Pivoted between the plates are a pair of gripping fingers 8 having cooperating upstanding gripping pins 9 at their outer ends for gripping the plant 10 therebetween. The gripping fingers are operated into open and closed position for engaging and releasing the plant, in any desired manner, such as described in my co-pending application Serial No. 286,274 of even date herewith.

The plants 10 are placed in position for engagement by the gripping fingers while the chain or conveyor is running parallel to the ground. At the end of the horizontal travel of the grippers the fingers close and carry the plant with them downward toward the ground and around the pulley 3 and then upward to the horizontal position. At the moment when the gripping fingers travel around the pulley 3 the position of the plant is perpendicular to the ground ready for planting. The plow designated at 11 is provided for opening a furrow allowing the plant to be carried in an open furrow which is afterwards closed by a suitable mechanism (not shown).

At the inner corners of the links 4 pins 12 are provided connecting the plates 5 and 6 on which are pivotally mounted the connecting members 13 and 14. The connecting member 13 has one end positioned between the plates 5 and 6 and pivotally mounted on one of the pins 12 and with its opposite end bifurcated as shown at 15 and projecting in a direction toward an adjacent link. The member 14 has one end positioned between the plates of the said adjacent link and pivoted on the pin 12 thereof, the other end of the member 14 being inserted between the bifurcated end of the member 13 and pivotally connected thereto by a pin 16, said pin being positioned at right angles to the pins 12.

Accordingly the members 13 and 14 permit the pivotal movement of the links 4 of the chain in two directions while passing over the horizontal as well as the vertical pulleys.

It is believed the details of construction and manner of operation of the device will be readily understood from the foregoing description without further detailed explanation.

What is claimed is:

1. In a planting machine, a carrier in the form of an endless conveyor for a plurality of plant gripping members, said conveyor including a plurality of flat plates between which the gripping members are pivotally mounted, pins connecting each pair of the plates in flatwise spaced relation, connectors pivoted on the pins and forming spacing means for the plates, said connectors projecting laterally from the plates and a pin pivotally connecting the connectors of adjacent pairs of plates, said pins being positioned at right angles to each other whereby each pair of plates is capable of pivotal movement in two directions.

2. In a planting machine, a carrier in the form of an endless conveyor for a plurality of plant gripping members, said conveyor including a plurality of flat plates between which the gripping members are pivotally mounted, pins connecting each pair of the plates in flatwise spaced relation and connectors for each pair of plates, said connectors embodying pivoted sections, each having one end pivoted between the spaced plates and adapted for pivotally connecting adjacent pairs of plates for movement in two directions on axes at right angles to each other.

ISRAEL POMIERANIEC.